(12) United States Patent
Clifford et al.

(10) Patent No.: US 9,867,325 B2
(45) Date of Patent: Jan. 16, 2018

(54) WORK VEHICLE WITH HYDRAULIC ASSIST FOR POWER OFF STEERING

(71) Applicant: CNH Industrial America LLC, New Holland, PA (US)

(72) Inventors: Jimmie D. Clifford, Lancaster, PA (US); Brent E. Smith, Lititz, PA (US); Bruce E. Anderson, Lancaster, PA (US); Jeffrey C. Trowbridge, Stevens, PA (US); Guy H. J. Osselaere, Zedelgem (BE); Rik Vandendriessche, Eernegem (BE); Carlos J. A. Verheye, Roeselare (BE); Wim Leplae, Ardooie (BE)

(73) Assignee: CNH Industrial America LLC, New Holland, PA (US)

( * ) Notice: Subject to any disclaimer, the term of this patent is extended or adjusted under 35 U.S.C. 154(b) by 161 days.

(21) Appl. No.: 14/689,872

(22) Filed: Apr. 17, 2015

(65) Prior Publication Data

US 2015/0305225 A1 Oct. 29, 2015

Related U.S. Application Data

(60) Provisional application No. 61/985,547, filed on Apr. 29, 2014.

(51) Int. Cl.
*A01B 69/00* (2006.01)
*B62D 5/30* (2006.01)
*A01D 41/12* (2006.01)

(52) U.S. Cl.
CPC ............ *A01B 69/007* (2013.01); *A01D 41/12* (2013.01); *B62D 5/30* (2013.01)

(58) Field of Classification Search
CPC ......... A01B 69/007; A01D 41/12; B62D 5/30
USPC ........... 60/404, 413, 418; 180/133, 140, 442
See application file for complete search history.

(56) References Cited

U.S. PATENT DOCUMENTS

| 3,202,238 | A | * | 8/1965 | Strader | ................. | B62D 7/142 |
| | | | | | | 180/403 |
| 3,820,620 | A | | 6/1974 | Miller et al. | | |
| 3,935,918 | A | | 2/1976 | Hicks et al. | | |
| 4,013,138 | A | * | 3/1977 | McBurnett | ............... | B62D 5/32 |
| | | | | | | 180/406 |
| 4,015,681 | A | | 4/1977 | Shore et al. | | |

(Continued)

FOREIGN PATENT DOCUMENTS

DE          4314616 A1    3/1994

*Primary Examiner* — Jacob D Knutson
(74) *Attorney, Agent, or Firm* — Patrick M. Sheldrake

(57) ABSTRACT

A steering system for a work vehicle includes a steering hand pump, a hydraulic main supply line fluidly coupled with the steering hand pump and including a check valve, and a normally open, two position valve. The valve includes an inlet fluidly couplable with a pressurized access point of a hydraulic sub-system, an outlet fluidly coupled with the main supply line on a downstream side of the check valve, and a pilot port fluidly coupled with the main supply line on an upstream side of the check valve. The valve is operable in the closed position based on pressure in the main supply line when the main supply line is pressurized from a pressure source, and operable in the open position and interconnecting the pressurized access point with the main supply line through the outlet when the main supply line is not pressurized from the pressure source.

13 Claims, 3 Drawing Sheets

(56) References Cited

U.S. PATENT DOCUMENTS

| | | | |
|---|---|---|---|
| 4,131,177 A | | 12/1978 | Goodbary et al. |
| 4,160,490 A | | 7/1979 | Bexten et al. |
| 4,343,151 A | | 8/1982 | Lorimor |
| 4,574,904 A | * | 3/1986 | Goode ..................... B62D 5/32 180/406 |
| 4,762,195 A | | 8/1988 | McBurnett |
| 4,898,078 A | * | 2/1990 | Gage ..................... E02F 9/2217 303/9.61 |
| 5,191,952 A | * | 3/1993 | Satzler ............... B62D 49/0635 180/24.02 |
| 5,201,174 A | | 4/1993 | Barber et al. |
| 5,826,676 A | | 10/1998 | Ko |
| 7,597,168 B2 | * | 10/2009 | Anderson ................ B62D 1/22 180/197 |
| 2011/0197575 A1 | * | 8/2011 | Prigent ................ F04C 11/003 60/413 |
| 2013/0298541 A1 | * | 11/2013 | Carlin ...................... F15B 1/04 60/327 |

* cited by examiner

WORK VEHICLE WITH HYDRAULIC ASSIST FOR POWER OFF STEERING

CROSS REFERENCE TO RELATED APPLICATIONS

This application claims the benefit of and priority to U.S. Provisional Application No. 61/985,547, filed Apr. 29, 2014, entitled WORK VEHICLE WITH HYDRAULIC ASSIST FOR POWER OFF STEERING, which is hereby incorporated by reference in its entirety.

BACKGROUND OF THE INVENTION

1. Field of the Invention

The present invention relates to work vehicles such as agricultural work vehicles, and, more particularly, to steering systems within such work vehicles.

2. Description of the Related Art

Work vehicles typically include agricultural, construction, industrial and forestry work vehicles. Examples of work vehicles include agricultural harvesters and tractors, construction backhoes, and forestry feller/bunchers.

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

Combines, as well as other agricultural vehicles, have tended to be larger over time since farming operations have become larger over time. With power steering systems it is still possible for an operator to easily steer these large combines. However, some geographic regions in the world (e.g., Europe) have regulated requirements regarding the ability to steer a combine when the power steering system is not powered. With the power to the power steering off, it can be very difficult for an operator to steer the heavy combine with high forces between the ground and wheels.

What is needed in the art is a work vehicle which can be satisfactorily steered when the power steering system is not powered.

SUMMARY OF THE INVENTION

The present invention provides a hydraulic assist for a steering system which diverts pressurized fluid from another hydraulic sub-system onboard the work vehicle when the main supply line to the steering hand pump loses pressure.

The invention in one form is directed to work vehicle including a chassis and a plurality of ground engaging members carried by the chassis. A hydraulic steering system is connected with at least one of the ground engaging members, and includes a steering hand pump. A hydraulic main supply line is fluidly coupled between a pressure source and the steering hand pump, and includes a check valve. A hydraulic sub-system includes a pressurized access point. A normally open, two position valve includes an inlet fluidly coupled with the pressurized access point, an outlet fluidly coupled with the main supply line on a downstream side of the check valve, and a pilot port fluidly coupled with the main supply line on an upstream side of the check valve. The valve is operable in the closed position based on pressure in the main supply line when the main supply line is pressurized from the pressure source, and operable in the open position and interconnecting the pressurized access point with the main supply line through the outlet when the main supply line is not pressurized from the pressure source.

The invention in another form is directed to a steering system for a work vehicle, including a steering hand pump, a hydraulic main supply line fluidly coupled with the steering hand pump and including a check valve, and a normally open, two position valve. The valve includes an inlet fluidly couplable with a pressurized access point of a hydraulic sub-system, an outlet fluidly coupled with the main supply line on a downstream side of the check valve, and a pilot port fluidly coupled with the main supply line on an upstream side of the check valve. The valve is operable in the closed position based on pressure in the main supply line when the main supply line is pressurized from a pressure source, and operable in the open position and interconnecting the pressurized access point with the main supply line through the outlet when the main supply line is not pressurized from the pressure source.

An advantage of the present invention is that the steering system can still be relatively easily steered when the pressure from the pressure source to the steering system falls below a preset value.

Another advantage is that the hydraulic steering system and hydraulic sub-system are independently powered, such that when the pressure within the main supply line falls below the preset value, the steering system can still be independently powered from the other hydraulic sub-system.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
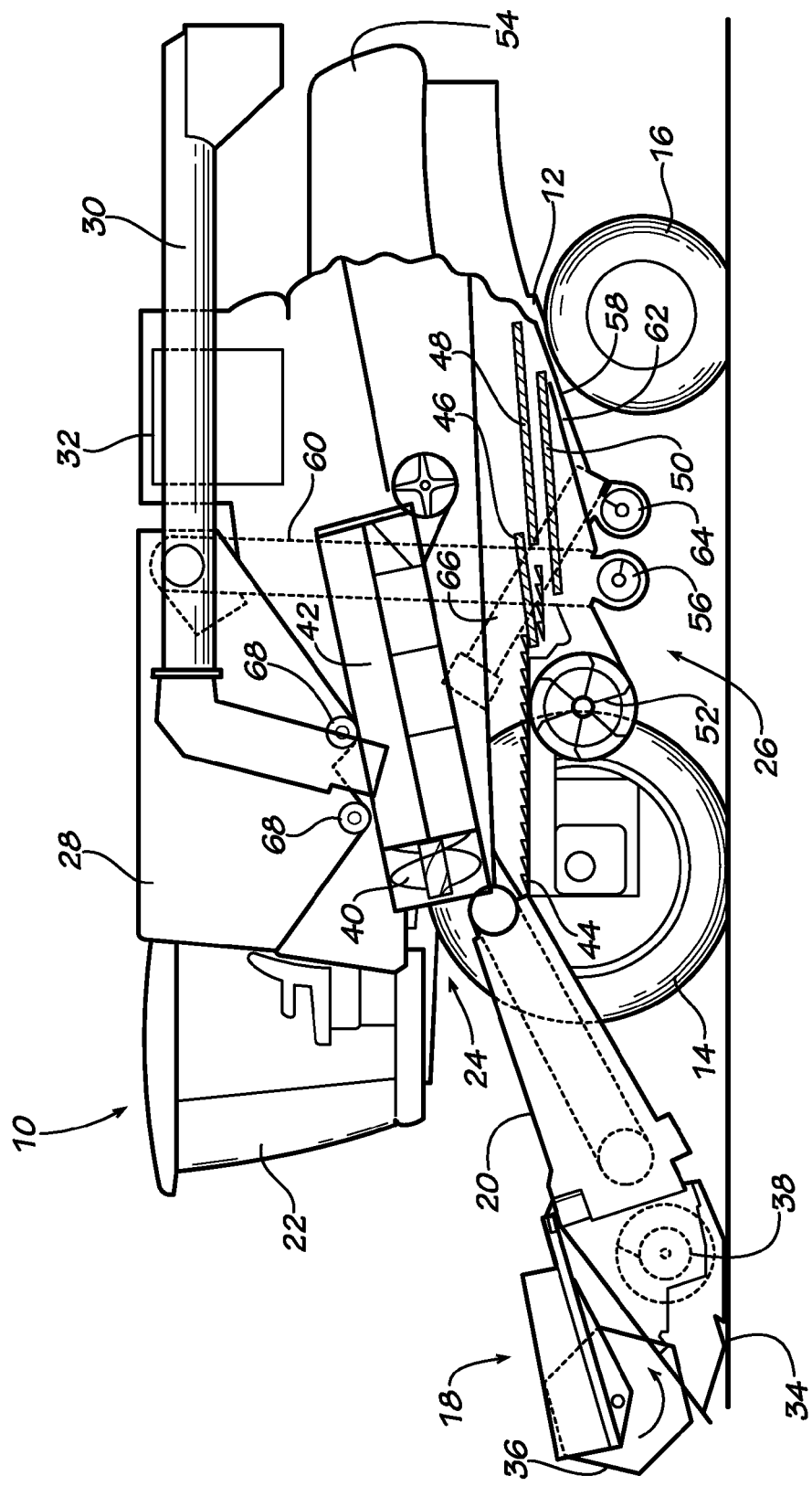
FIG. 1 is a side view of an embodiment of an agricultural harvester in the form of a combine which may include a steering system of the present invention.

Referring now to the drawings, and more particularly to FIG. 1, there is shown an agricultural harvester in the form of a combine 10, which generally includes a chassis 12, ground engaging members 14 and 16, header 18, feeder housing 20, operator cab 22, threshing and separating system 24, cleaning system 26, grain tank 28, and unloading auger 30.

Ground engaging members 14 and 16 are shown as wheels, but could also be configured as tracks and/or half tracks. Front wheels 14 are larger flotation type wheels, and rear wheels 16 are smaller steerable wheels. Motive force is selectively applied to front wheels 14 through a power plant in the form of a diesel engine 32 and a transmission (not shown).

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
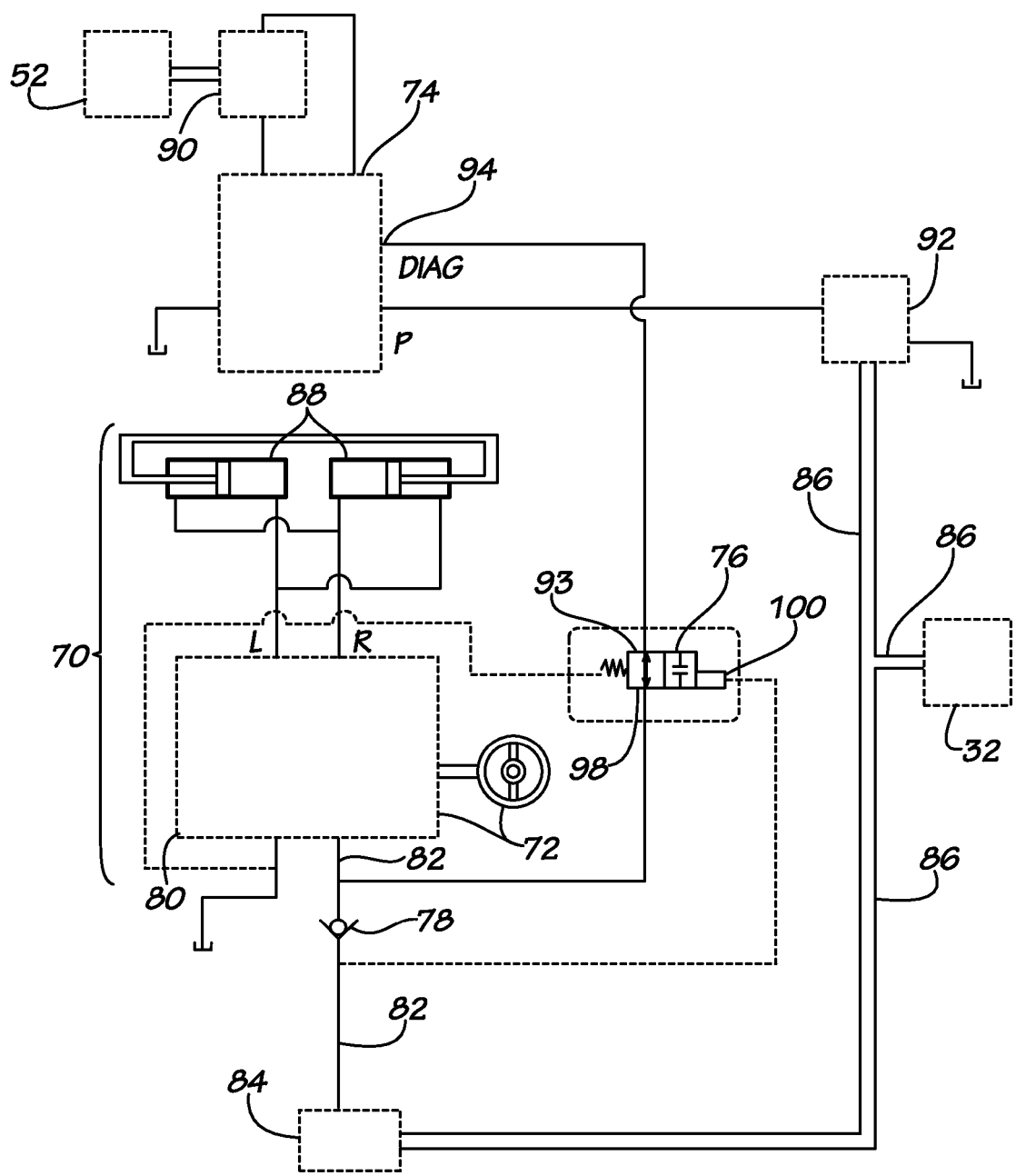
FIG. 2 is a schematic illustration of a hydraulic circuit for a steering system which can be used in the combine of FIG. 1, including an embodiment of a hydraulic assist of the present invention.

According to an aspect of the present invention, and referring now to FIG. 2, a schematic illustration of a steering system 70 of the present invention is shown and will be described hereinafter. Steering system 70 generally includes a hydraulic steering arrangement 72, a hydraulic sub-system 74, a valve 76 and a check valve 78.

Hydraulic steering arrangement 72 includes a steering hand pump 80 which receives pressurized hydraulic fluid via a main supply line 82 from a pressure source 84, such as a hydraulic pump. Pressure source 84 is driven by a power takeoff (PTO) 86 which is directly or indirectly driven by internal combustion (IC) engine 32. Steering hand pump 80 operates a pair of two-way steering cylinders 88 which are respectively associated with a pair of steerable wheels on the combine 10. The number of wheels which are steered by steering hand pump 80 can vary. Steering hand pump 80 may be of conventional design, and is not described in further detail herein.

Hydraulic sub-system 74 is separate from the hydraulic steering arrangement 72. In the illustrated embodiment, hydraulic sub-system 74 is in the form of a cleaning fan drive which powers a cleaning fan motor 90 associated with a cleaning fan 52. Cleaning fan drive 74 receives pressurized hydraulic fluid from a pump 92, which is driven by PTO 86 and in turn directly or indirectly driven by IC engine 32. The cleaning fan drive 74 itself may be of conventional design, and thus not described further herein.

One aspect of the present invention is that the cleaning fan drive 74 is independently powered or pressurized from the hydraulic steering arrangement 72, such that if the working pressure is lost within the hydraulic steering arrangement 72, hydraulic pressure can be used from the cleaning fan drive 74 to operate the steering hand pump 80 of hydraulic steering arrangement 72. To that end, pressurized hydraulic fluid is accessed from the cleaning fan drive 74 at a convenient pressurized access point 94. In the illustrated embodiment, the pressurized access point 94 is a diagnostics port. However, the pressurized access point could also be a fluid line, channel, etc. associated with the cleaning fan drive 74 which is accessible and provides a source of pressurized hydraulic fluid.

Valve 76 and check valve 78 allow pressurized fluid to be scavenged from the cleaning fan drive 74 when the pressure within the main supply line 82 falls below a preset value on the upstream side of check valve 78. Valve 76 can be configured as a normally open, two-way/2 position valve which includes an inlet 96 which is fluidly coupled with the diagnostics port 94, an outlet 98 which is fluidly coupled with the main supply line 82 on a downstream side of the check valve 78, and a pilot port 100 which is fluidly coupled with the main supply line 82 on an upstream side of the check valve 78. An optional accumulator (not shown) can be coupled with the fluid line interconnecting the diagnostics port 94 with the inlet 96, so as to provide instantaneous pressurized fluid to the outlet 98 in the event that the valve 76 is biased to the open position. The valve 76 is operable in the closed position based on pressure in the main supply line 82 when the main supply line 82 is pressurized from the pressure source 84, and the valve 76 is operable in the open position and interconnects the pressurized access point 94 with the main supply line 82 through the outlet 98 when the main supply line 82 is not pressurized from the pressure source 84. The valve 76 is mechanically biased to the open position (as shown in FIG. 2), and pressure within the pilot port 100 moves the valve 76 to the closed position when the pressure in the main supply line is above a preset value.

During operation of work vehicle 10, pump 84 is driven by the PTO 86. The pressure within the main supply line 82 on the upstream side of check valve 78 communicates with pilot port 100 and biases the valve 76 to the closed position (to the left as shown in FIG. 2). If the pressure within the main supply line 82 falls below a preset value, which is determined based on operating parameters of steering hand pump 80, then the valve 76 is biased back to the open position and pressurized fluid is allowed to flow through the outlet 98 to the main supply line 82 on the downstream side of the check valve 78.

In the illustrated embodiment, the hydraulic sub-system is shown as a cleaning fan drive 74. The hydraulic sub-system can also be configured as a different type of sub-system on board combine 10, as long as the hydraulic fluid is separately pressurized so that a separate and independent source of pressurized fluid is available to the hydraulic steering arrangement 72 in the event that the pressure within the main supply line 82 from the pressure source 84 falls below a preset value. For example, the hydraulic sub-system can also be configured as a hydrostatic transmission which is separately powered through a mechanical or electrical drive arrangement.

Figure 3:
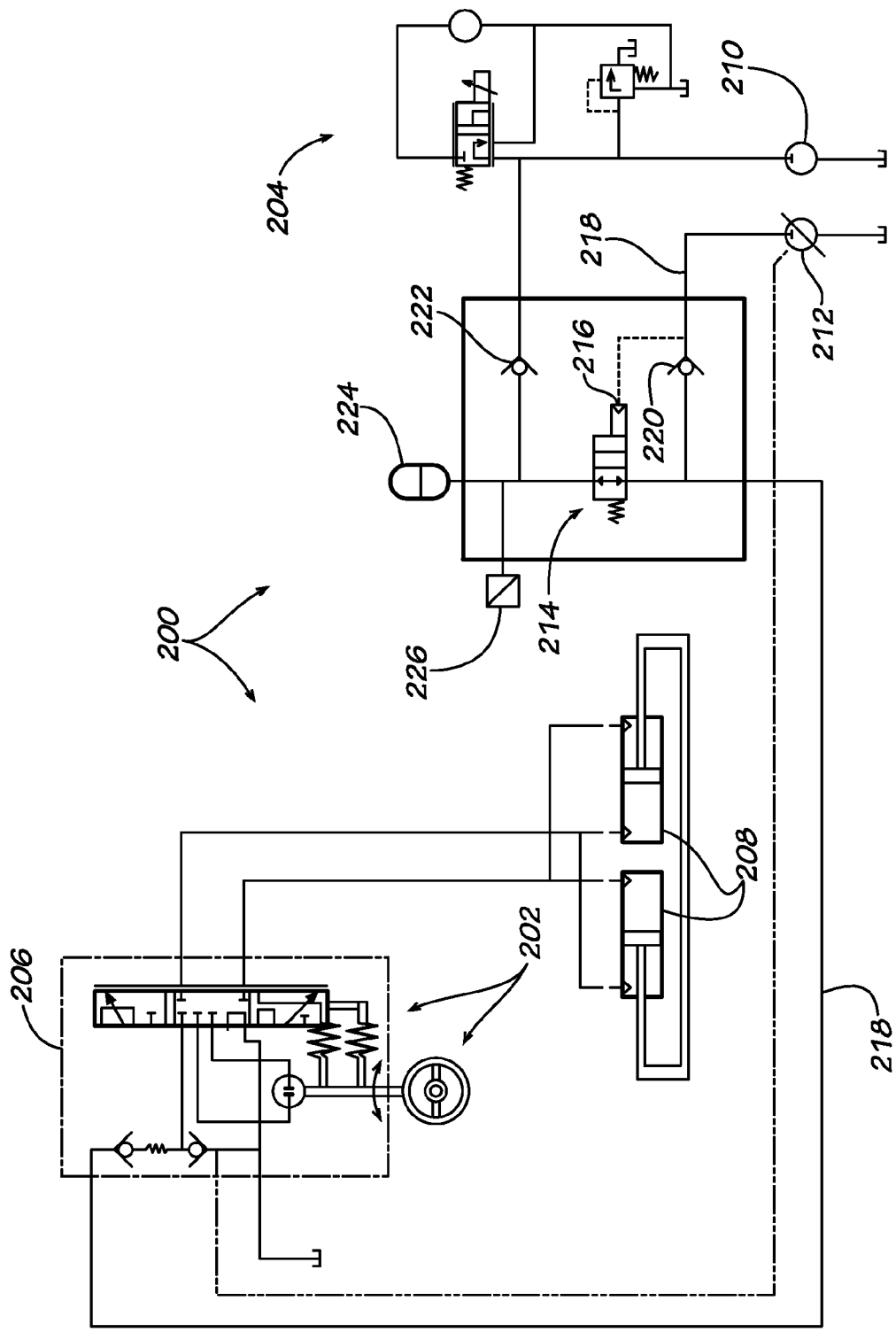
FIG. 3 is a schematic illustration of another embodiment of a hydraulic circuit for a steering system which can be used in the combine of FIG. 1.

Referring now to FIG. 3, there is shown another embodiment of a hydraulic circuit for a steering system 200 of the present invention. Steering system 200 includes a hydraulic steering arrangement 202 and hydraulic sub-system 204. Hydraulic steering arrangement 202 includes a steering hand pump 206 and a pair of steering cylinders 208, similar to the steering hand pump 80 and steering cylinders 88 shown in FIG. 2. The hydraulic sub-system 204 is in the form of a cleaning fan drive, similar to the cleaning fan drive 74 shown in FIG. 2. The cleaning fan drive 204 is pressurized with a pump 210 and the hydraulic steering arrangement 202 is pressurized with a pump 212.

The steering system 200 also includes a normally open 2 way/2 position pilot operating valve 214 having a pilot port 216 which is connected with the main supply line 218 on an upstream side of a check valve 220. A second check valve 222 is connected with the second pump 210 providing a second source of pressure. An accumulator 224 is pressurized to a predetermined pressure, and a sensor 226 monitors the pressure within the accumulator 224.

During operation, the hydraulic fluid flows though the check valve 220 to the steering hand pump 206. When the pressure within the main supply line 218 is normal, the pressure in the main supply line 218 is higher than the pilot pressure and the valve 214 is in the one-way position to allow the accumulator 224 to be pressurized. When the pressure in the main supply line 218 is below a preset value, the valve 214 is in the 2 way open position and the accumulator 224 provides pressurized fluid to the hydraulic steering arrangement 202 to aid the driver in controlling the combine 10. In a second stage the accumulator 224 is connected with the pump 210 via check valve 222 for a second source of pressurized fluid. The check valve 222 prevents the accumulator 224 from being depressurized. During field mode operation the pressure in the cleaning system is high enough to keep the accumulator 224 under pressure. In road mode operation the return pressure of the second source is high enough to give flow and pressure to assist the steering in the event pump 212 fails. The sensor 226 is used to monitor the pressure in the accumulator 224 for two reasons: 1) to ensure that the accumulator 224 is pressurized above a certain pressure that is sufficient to assist with steering, and 2) to detect if the accumulator is defective (e.g., sudden drop in pressure). When no sensor is used, the valve 204 can be activated when the combine 10 has a ground speed within a given range to ensure power steering assist.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A work vehicle, comprising:
   a chassis;
   a plurality of ground engaging members carried by the chassis;
   a hydraulic steering system connected with at least one of the ground engaging members, the hydraulic steering system including a steering hand pump;
   a hydraulic main supply line fluidly coupled between a pressure source and the steering hand pump, the main supply line including a check valve;
   a hydraulic sub-system powering a component of said work vehicle other than said hydraulic steering system and wherein the hydraulic steering system and the hydraulic sub-system are independently powered relative to each other including a pressurized access point; and
   a normally open, two position valve including an inlet fluidly coupled with the pressurized access point, an outlet fluidly coupled with the main supply line on a downstream side of the check valve, and a pilot port fluidly coupled with the main supply line on an upstream side of the check valve, the two position valve being operable in the closed position based on pressure in the main supply line when the main supply line is pressurized from the pressure source, the two position valve being operable in the open position and interconnecting the pressurized access point with the main supply line through the outlet when the main supply line is not pressurized from the pressure source.

2. The work vehicle of claim 1, wherein the pressurized access point includes a fluid port or a fluid line.

3. The work vehicle of claim 2, wherein the work vehicle is an agricultural combine and the hydraulic sub-system includes a cleaning fan drive with a cleaning fan valve having a diagnostics port, and the pressurized access point is the diagnostics port.

4. The work vehicle of claim 1, wherein the valve is a normally open, two way/two position valve.

5. The work vehicle of claim 4, wherein the valve is mechanically biased to the open position, and pressure within the pilot port moves the valve to the closed position when the pressure in the main supply line is above a preset value.

6. The work vehicle of claim 5, wherein the valve is mechanically biased to the open position when the work vehicle is in a road mode.

7. The work vehicle of claim 1, wherein the hydraulic steering system and the hydraulic sub-system are independently powered by a power take off (PTO) coupled with an internal combustion (IC) engine.

8. The work vehicle of claim 7, wherein the pressure source is powered by the PTO.

9. The work vehicle of claim 1, wherein the plurality of ground engaging members each include a wheel, track or half track.

10. The work vehicle of claim 1, wherein the work vehicle is an agricultural combine.

11. A steering system for a work vehicle, comprising:
a steering hand pump;
a hydraulic main supply line fluidly coupled with the steering hand pump and including a check valve; and
a normally open, two position valve including an inlet fluidly couplable with a pressurized access point of a hydraulic sub-system for a component of the work vehicle other than said hydraulic steering system, an outlet fluidly coupled with the main supply line on a downstream side of the check valve, and a pilot port fluidly coupled with the main supply line on an upstream side of the check valve, the two position valve being operable in the closed position based on pressure in the main supply line when the main supply line is pressurized from a pressure source, the two position valve being operable in the open position and interconnecting the pressurized access point with the main supply line through the outlet when the main supply line is not pressurized from the pressure source.

12. The steering system of claim 11, wherein the valve is a normally open, two way/two position valve.

13. The steering system of claim 12, wherein the valve is mechanically biased to the open position, and pressure within the pilot port moves the valve to the closed position when the pressure in the main supply line is above a preset value.

* * * * *